US012477426B2

(12) United States Patent
Mohammed et al.

(10) Patent No.: US 12,477,426 B2
(45) Date of Patent: Nov. 18, 2025

(54) APPARATUS AND METHODS TO MITIGATE NO BANDWIDTH PART SWITCHING IN 5G STANDALONE DEPLOYMENTS

(71) Applicant: APPLE INC., Cupertino, CA (US)

(72) Inventors: Sofheem Mohammed, Santa Clara, CA (US); Harshal R. Mane, San Jose, CA (US); Rohit Thareja, Redwood City, CA (US); Vijay Venkataraman, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 349 days.

(21) Appl. No.: 18/240,546

(22) Filed: Aug. 31, 2023

(65) Prior Publication Data
US 2025/0081067 A1 Mar. 6, 2025

(51) Int. Cl.
H04W 36/30 (2009.01)
(52) U.S. Cl.
CPC .................. H04W 36/30 (2013.01)
(58) Field of Classification Search
CPC ......... H04W 36/30; H04W 36/008355; H04W 36/008375; H04W 36/0085; H04W 76/15; H04W 48/20
See application file for complete search history.

(56) References Cited

U.S. PATENT DOCUMENTS

| 2022/0295360 A1* | 9/2022 | Nagarajan ....... H04W 36/00224 |
| 2023/0076738 A1 | 3/2023 | Dhanapal et al. |
| 2024/0187982 A1* | 6/2024 | Murugan .............. H04W 48/20 |

OTHER PUBLICATIONS

PCT/US2024/044141, International Search Report and Written Opinion, Dec. 10, 2024, 14 pages.
Qualcomm Incorporated, "Complexity Reduction for RedCap Devices", R1-2101471, 3GPP TSG-RAN WG1 Meeting #104, e-Meeting, Agenda Item 8.6.1, Jan. 25-Feb. 5, 2021, 11 pages.

* cited by examiner

Primary Examiner — Charles N Appiah
Assistant Examiner — Frank E Donado
(74) Attorney, Agent, or Firm — Dorsey & Whitney LLP

(57) ABSTRACT

Apparatus and methods are provided for a user equipment (UE) to communicate with a new radio (NR) wireless network in a standalone deployment. The UE camps on a first cell and determines that a first bandwidth (BW) of the first cell is greater than or equal to a threshold BW value. In response, when the UE is not configured for bandwidth part switching (BWPS), the UE determines whether a second cell is available that is intraband with and has a same priority as the first cell and that has a second BW that is less than the threshold BW value. When the second cell is not available, the UE searches for a next lower priority cell that has a third BW that is less than the threshold BW value.

20 Claims, 4 Drawing Sheets

APPARATUS AND METHODS TO MITIGATE NO BANDWIDTH PART SWITCHING IN 5G STANDALONE DEPLOYMENTS

TECHNICAL FIELD

This application relates generally to wireless communication systems, including methods for a user equipment (UE) to communicate with a new radio (NR) wireless network in standalone (SA) deployments.

BACKGROUND

Wireless mobile communication technology uses various standards and protocols to transmit data between a base station and a wireless communication device. Wireless communication system standards and protocols can include, for example, 3rd Generation Partnership Project (3GPP) Long Term Evolution (LTE) (e.g., 4G), 3GPP New Radio (NR) (e.g., 5G), and Institute of Electrical and Electronics Engineers (IEEE) 802.11 standard for Wireless Local Area Networks (WLAN) (commonly known to industry groups as Wi-Fi®).

As contemplated by the 3GPP, different wireless communication systems' standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, Global System for Mobile communications (GSM), Enhanced Data Rates for GSM Evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements Universal Mobile Telecommunication System (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC) while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

In some wireless systems, a network may contain high bandwidth and high priority cells. A UE may camp on the highest priority high bandwidth cells set by the network (NW) irrespective of the bandwidth (BW) considerations of the cell or the bandwidth needs of the UE. In some examples when high bandwidth is not needed for the task at hand, a UE may remain on the higher bandwidth cell. In many cases, this may be an inefficient use of both power and bandwidth.

In some wireless systems, a standalone (SA) network may be utilized. A 5G SA network, may be considered as a self-contained network that operates independently without relying on connections to external networks (e.g., an LTE network). It functions as a complete entity, with hardware, software, and infrastructure to support its operations. Standalone networks often have their own servers, databases, and security measures, enabling them to operate autonomously. In other wireless systems, a non-standalone (NSA) network may be utilized. An NSA network, may be considered as a type of network architecture that depends on external components or networks to fully function. A 5G NSA typically utilizes connections to other networks (e.g., an LTE network) to provide certain functionalities, services, or resources. NSA networks often rely on external resources to perform tasks such as data storage, processing, or authentication, and may rely on cloud services or third-party platforms.

In some embodiments, a UE may be able to intelligently make decisions to camp on a lower bandwidth SA cell based on demands of the UE and/or availability of a low or high bandwidth cell. In some such embodiments, if a low bandwidth cell is not available the UE may be able to take advantage of and camp on a higher BW SA cell efficiently.

In some embodiments, to overcome the aforementioned issue of inefficient use of power and bandwidth and so that a UE may stay camped on a superior RAT SA NR, even when bandwidth part switching (BWPS) is not supported, the UE may camp on a lower BW SA cell if available. Some such embodiments may make the UE more power efficient and bandwidth may be utilized more efficiently. Alternatively or in addition, if a lower BW cell is not available, the UE may camp on higher bandwidth cells in a way that utilizes bandwidth more efficiently.

Figure 1A:
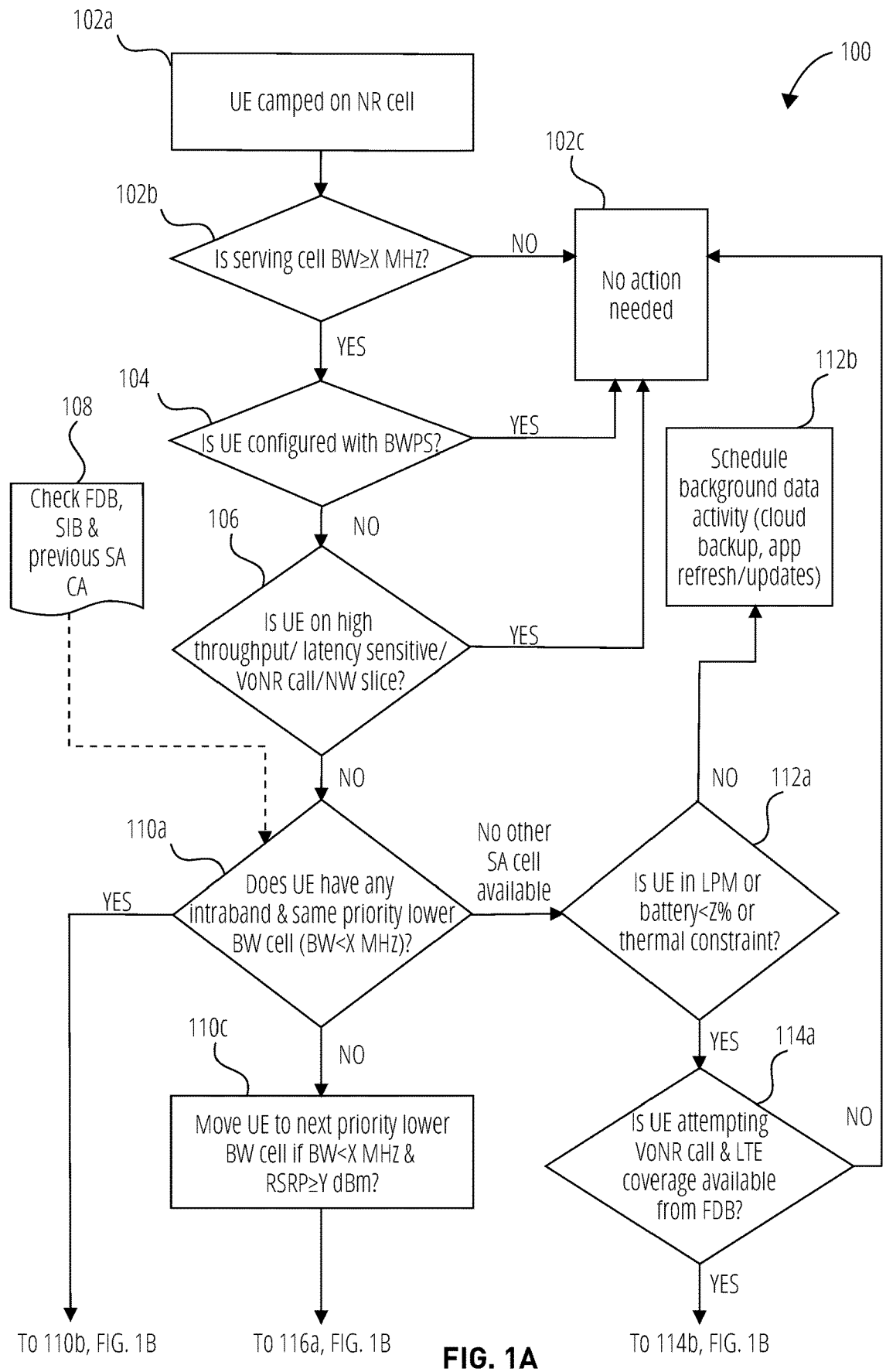
FIG. 1A and FIG. 1B illustrate a flowchart of a method for a UE to communicate with a NR wireless network in SA deployment according to embodiments herein.
Figure 1B:
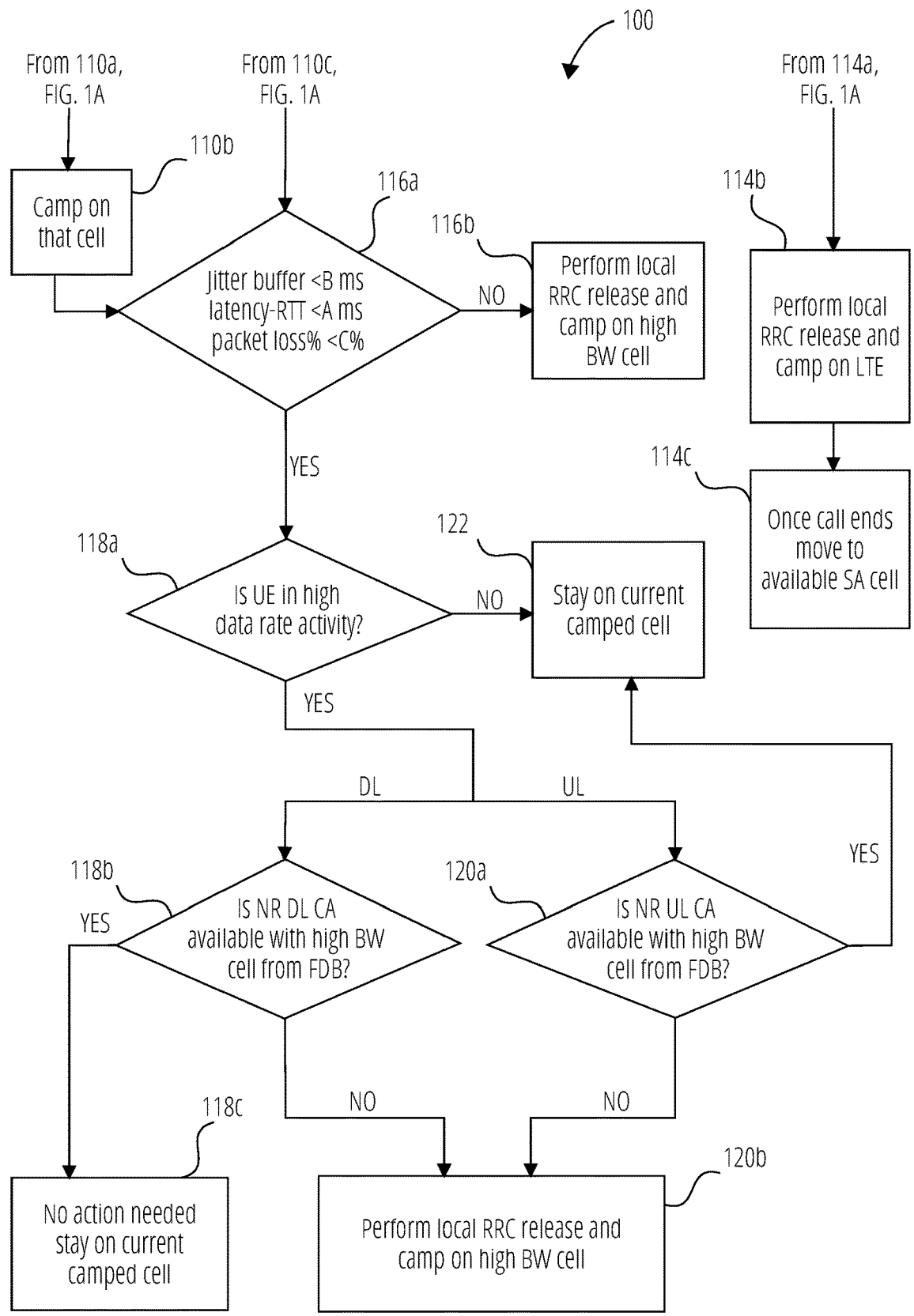

FIG. 1A and FIG. 1B illustrate a flowchart of a method 100 for a UE to communicate with a NR wireless network in SA deployment according to embodiments herein. The flowchart of the method 100 for a UE, for example, illustrates decisions made by the UE to camp on low BW SA cells, and to efficiently use higher bandwidth cells when a lower bandwidth cell is not available.

The illustrated method 100 includes camping 102a the UE on a first cell of the NR wireless network in the SA deployment, wherein the first cell is a serving cell.

The method 100 further includes determining 102b, at the UE, that a first BW of the first cell is greater than or equal to a threshold BW value. The threshold BW value may be a preconfigured value (e.g. X MHz). In some examples, the threshold BW value may be used to determine if the cell is a high bandwidth cell or low bandwidth cell. Merely for example, a 40 MHz cell may be considered a high BW cell above the threshold BW value and a 20 MHz cell may be considered a low BW cell below the threshold BW value. If the first cell is less than the threshold BW value, no action is needed 102c and the UE may stay camped on the first cell.

The method 100 further includes, in response to the first BW of the first cell being greater than or equal to the threshold BW value, determining 104 whether the UE is configured with BWPS. In some examples, BWPS is a network feature in which the network may move the UE to a different NR BW (e.g., a lower BW or higher BW) depending on ongoing data activity at the UE. If the UE is configured with BWPS, then no action is needed 102c and the UE may stay camped on the first cell. However, in response to determining that the UE is not configured by the NR wireless network for BWPS, the method 100 further includes determining 106 (e.g., based on one or more applications running on the UE) whether the UE has any ongoing high throughput data activity, is running a latency sensitive application, is participating in or attempting a voice over NR (VoNR) call, and/or is using a NW slice associated with high BW and/or low latency. If yes, no action is needed 102c and the UE may stay camped on the first cell. If no, however, the method 100 further includes determining 110a, at the UE, whether a second cell is available that is intraband with and has a same priority as the first cell and that has a second BW that is less than the threshold BW value (i.e., BW<X MHz). The second cell is of the NR wireless network in the SA deployment. In some embodiments of the method 100, to assist in determining 110a whether the second cell is available, the UE checks 108 a fingerprint database (FDB) based on location, a system information block (SIB), and/or previously known SA carrier aggregation (CA) combinations.

The method 100 further includes, when the second cell is not available, searching for a third cell with a next lower priority, that has a third BW that is less than the threshold BW value (i.e., BW<X MHz), and that has a reference signal received power (RSRP) measured at the UE greater than or equal to an RSRP threshold value Y (i.e., RSRP≥Y dBm). The third cell is of the NR wireless network in the SA deployment. When the third cell is available with a next lower priority, BW<X MHZ, and RSRP≥Y dBm, the UE moves 110c to and camps on that cell. In some such embodiments, the RSRP threshold value Y may be a preconfigured threshold value (e.g. Y decibel milliwatts (dBm)). In some examples, the third cell may have an RSRP threshold that may be met so as to avoid any poor coverage cells that may be considered a lower BW cell when the UE is moves 110c to the third cell.

In some examples, camping on intraband cells may allow for better coverage as the UE, when camping on an intraband cell, may not switch to a cell with poor coverage or to a cell with high interference that may exist in a different band. Further, in some examples, no performance degradation or radio frequency (RF) degradation may be expected when camping on an intraband cell.

The method 100 further includes, when the second cell is available, camping 110b the UE on that cell or, in other words, the UE may camp on the second cell.

In some embodiments, the method 100 further comprises, when the UE is camped on the second cell or the third cell, checking 116a user experience metrics corresponding to one or more of a jitter buffer, a round-trip time (RTT) latency, and a packet loss percentage. In response to the user experience metrics meeting a predetermined criteria. In some such embodiments, to meet the predetermined criteria for the user experience metrics, one or more of the following are met: the jitter buffer may be less than a jitter buffer threshold B (i.e., jitter buffer<B milliseconds (ms)); the RTT latency may be less than an RRT latency threshold A (i.e., latency-RTT<A ms); and/or the packet loss percentage may be less than a packet loss threshold C (i.e., packet loss %<C %). In another such embodiment, all three threshold conditions are to be met to be considered meeting the predetermined criteria. By way of example, other user experience metrics are discussed herein with respect to Table 1.

When the predetermined criteria are not met, the method 100 includes performing 116b, at the UE, an RRC release and camping the UE on an available SA cell with a corresponding BW that is greater than or equal to the threshold BW value. In some examples, an available SA cell with a corresponding BW that is greater than or equal to the threshold BW may be considered a high BW cell. When the predetermined criteria are met, however, the method 100 includes determining 118a whether the UE is in high data rate activity. If the UE is not in high data rate activity, then the UE stays 122 on the current camped cell.

If the UE is in a high data rate activity for downlink (DL), the method 100 includes determining 118b whether NR DL CA combinations are available. In some such embodiments, the UE determines the availability of the NR DL CA combinations based upon information from the FDB. When the NR DL CA combinations are available, the UE stays 118c on the current camped cell and no action is needed. When the NR DL CA combinations are not available, the method 100 includes performing 120b, at the UE, a radio resource control (RRC) release and camping the UE on an available SA cell with a corresponding BW that is greater than or equal to the threshold BW value (i.e., a high BW cell). In some situations, camping on a high BW cell may provide a better experience and connectivity for the user as well as a more efficient use of BW.

If the UE is in a high data rate activity for uplink (UL), the method 100 includes determining 120a whether NR UL CA combinations are available. In some such embodiments, the UE determines the availability of the NR DL CA combinations based upon information from the FDB. When the NR UL CA combinations are available, the UE stays 122 on the current camped cell. When the NR UL CA combinations are not available, the method 100 includes performing 120b, at the UE, an RRC release and camping the UE on an available SA cell with a corresponding BW that is greater than or equal to the threshold BW value (i.e., a high BW cell). In some examples, camping on a high BW cell may provide a better experience and connectivity for the user as well as a more efficient use of BW.

As discussed above with respect to checking 116a user experience metrics shown in FIG. 1B, Table I provides examples of other user experience metrics that may be used in certain embodiments. For example, a packet delay budget metric from a 5G quality of service indicator (5QI) mapping from an RRC source, according to 3GPP Technical Specification (TS) 23.501 (see Table 5.7.4-1 describing standardized 5QI to QoS characteristics mapping), may have an output of packet delay budget>threshold_1 (Th_1) with a value of 100 ms. In a second example, a real time transport protocol (RTP) loss metric, from an RTP packet loss-baseband source, may have an output of RTP loss>Th_2% (Lost sequence number (SN)/Total transmitted SN)*100, with a 20% value. In a third example, a mean opinion score (MOS) Score metric, for an MoS from an access point application processor (AP) and/or baseband (BB) source, may have an output of moving average MoS drop>Th_3% with a 20% value. In a fourth example, a physical downlink shared channel/physical uplink shared channel (PDSCH/PUSCH) block error rate (BLER) metric, from a baseband source, may have an output of moving average BLER>Th_4% with a 20% value. In a fifth example, a packet data convergence protocol (PDCP) discards metric, from a baseband source, may have an output of moving average BLER>Th_5% with a 10% value.

TABLE 1

Other User Experience Metrics

| Metric | Source | Output | Values |
| --- | --- | --- | --- |
| Packet Delay Budget | 5QI mapping from RRC (TS 23.501, provided in Table 2) | Packet Delay budget > Th_1 | 100 ms |
| RTP Loss | RTP packet loss - Baseband 20% | RTP loss rate > Th_2% (Lost SN/Total transmitted SN) *100 | 20% |
| MoS Score | MoS from AP/BB | Moving average MoS drop > Th_3% | 20% |
| PDSCH/PUSCH BLER | Baseband | Moving average BLER > Th_4% | 20% |
| PDCP Discards | Baseband | Moving average BLER > Th_5% | 10% |

In some embodiments, the method 100 further comprises, upon determining 110a that the second cell and the third cell are not available (i.e., no other SA cell is available), determining 112a, at the UE, whether the UE is experiencing power constraints based on at least one of the UE being in a low power mode (LPM), the UE having a battery percentage below a battery level threshold (e.g., Z %), and the UE having a thermal constraint. For example, the thermal constraints of UE may include the UE staying below an operating temperature, that when exceeded may cause damage to the UE's internal components such as its battery. When the UE is not experiencing the power constraints, the method 100 includes scheduling 112b background data activity. In some embodiments, the background data activity may include one or more of backing up UE data to a cloud server or storage device, refreshing applications that may be running on the UE, or updating applications that may be on the UE.

In response to determining 112a that the UE is experiencing the power constraints, the method 100 includes determining 114a whether the UE is attempting a VoNR call and whether LTE) cell is available (e.g., as determined from the FDB). When the UE is not attempting the VoNR call or LTE coverage is not available, no action is needed 102c. However, when the UE is conducting the VoNR call and the LTE coverage is available, the method 100 includes performing 114b, at the UE, a first local RRC release and camping the UE on the LTE cell for a voice over LTE (VOLTE) call. In response to the VOLTE call ending, the method 100 includes performing a second RRC release from the LTE cell and moving 114c the UE on an available SA cell. The available SA cell may be, for example, the first cell or another SA cell with a corresponding BW that is greater than or equal to the threshold BW value.

At a high level, stated another way, the method 100 shown in FIG. 1A and FIG. 1B may be considered as entry criteria (corresponding to references shown as 102a, 102b, 102c, 104, 106, 108, 110a, 110b, 110c, 112a, 112b, 114a, 114b, 114c) for intelligently camping on a low BW SA cell based on usage/availability, and exit criteria (corresponding to references shown as 116a, 116b, 118a, 118b, 118c, 120a, 120b, 122) used when such a cell is not available so as to efficiently take advantage of a high BW SA cell.

For the entry criteria, the UE is camped on SA NR cell, checks whether the UE is camped on high BW cell-BW>X MHz, and if NO then no action needed (see 102a, 102b, 102c). But, if YES then check if the UE is configured with BWPS support from NW (see 104). If YES, then no action needed, but if NO (BWPS is not configured) then check if the UE has any ongoing high data activity and/or latency sensitive application running and/or active VoNR call (see 106). If YES then no action needed, but if NO then check a location database (locationDB) (e.g., the FDB), SIB, and/or previously known SA CA combinations (see 108), and check for any intraband and same priority lower BW cell (BW<X MHz) available (either from 108 or current camped cell). If same priority low BW NR cell is available then camp on to that NR cell. If NO (a same priority lower BW cell is not available), then move the UE to a next priority NR band with lower BW with RSRP>Y dBm (see 110a, 110b, 110c). If No other SA cell is available other than high BW SA cell on which UE is camped, then check the UE power status (e.g., is the UE in LPM or battery<Z % or thermal kicks in). If NO, then the UE can do background data activity (application refresh, cloud backup, etc.) utilizing the highest SA BW efficiently (see 112a, 112b). However, if YES, and if the UE is attempting a VoNR call, then check for LTE coverage from LocationDB. If LTE is available, then do local release and camp on LTE. Once the VOLTE call ends then move to an available SA cell. If NO (the UE is not attempting VoNR call and/or there is no LTE coverage from LocationDB), then no action is needed (see 114a, 114b, 114c).

For the exit criteria, the UE checks for user experience metrics (e.g., jitter buffer: latency RTT: packet loss %) when the UE is camped on a low BW SA cell. If the user experience is good (e.g., jitter buffer<B ms: latency RTT<A ms; and/or packet loss %<C %), stay camped on low BW SA cell. If the user experience is poor, then perform local RRC release and move to high BW SA cell (see 116a, 116b). While the UE is camped on a low BW SA cell, check if the UE is having any ongoing DL centric high throughput and if highest BW SA CA combinations are available from the database for DL. If YES, then no action needed, but if NO then perform local RRC release to camp on highest BW SA cell to perform highest SA CA combinations (see 118a, 118b, 118c). While the UE is camped on the low BW SA cell, check if the UE is having any ongoing UL centric high throughput and if highest BW SA CA combinations are available from database for UL. If YES, then no action needed, but if NO then perform local RRC release to camp on highest BW SA cell to perform highest SA CA combinations (see 120a, 120b, 122).

Embodiments contemplated herein include an apparatus comprising means to perform one or more elements of the method 100. This apparatus may be, for example, an apparatus of a UE (such as a wireless device 302 that is a UE, as described herein).

Embodiments contemplated herein include one or more non-transitory computer-readable media comprising instructions to cause an electronic device, upon execution of the instructions by one or more processors of the electronic device, to perform one or more elements of the method 100. This non-transitory computer-readable media may be, for example, a memory of a UE (such as a memory 306 of a wireless device 302 that is a UE, as described herein).

Embodiments contemplated herein include an apparatus comprising logic, modules, or circuitry to perform one or more elements of the method 100. This apparatus may be, for example, an apparatus of a UE (such as a wireless device 302 that is a UE, as described herein).

Embodiments contemplated herein include an apparatus comprising: one or more processors and one or more computer-readable media comprising instructions that, when executed by the one or more processors, cause the one or more processors to perform one or more elements of the method 100. This apparatus may be, for example, an apparatus of a UE (such as a wireless device 302 that is a UE, as described herein).

Embodiments contemplated herein include a signal as described in or related to one or more elements of the method 100.

Embodiments contemplated herein include a computer program or computer program product comprising instructions, wherein execution of the program by a processor is to cause the processor to carry out one or more elements of the method 100. The processor may be a processor of a UE (such as a processor(s) 304 of a wireless device 302 that is a UE, as described herein). These instructions may be, for example, located in the processor and/or on a memory of the UE (such as a memory 306 of a wireless device 302 that is a UE, as described herein).

Figure 2:
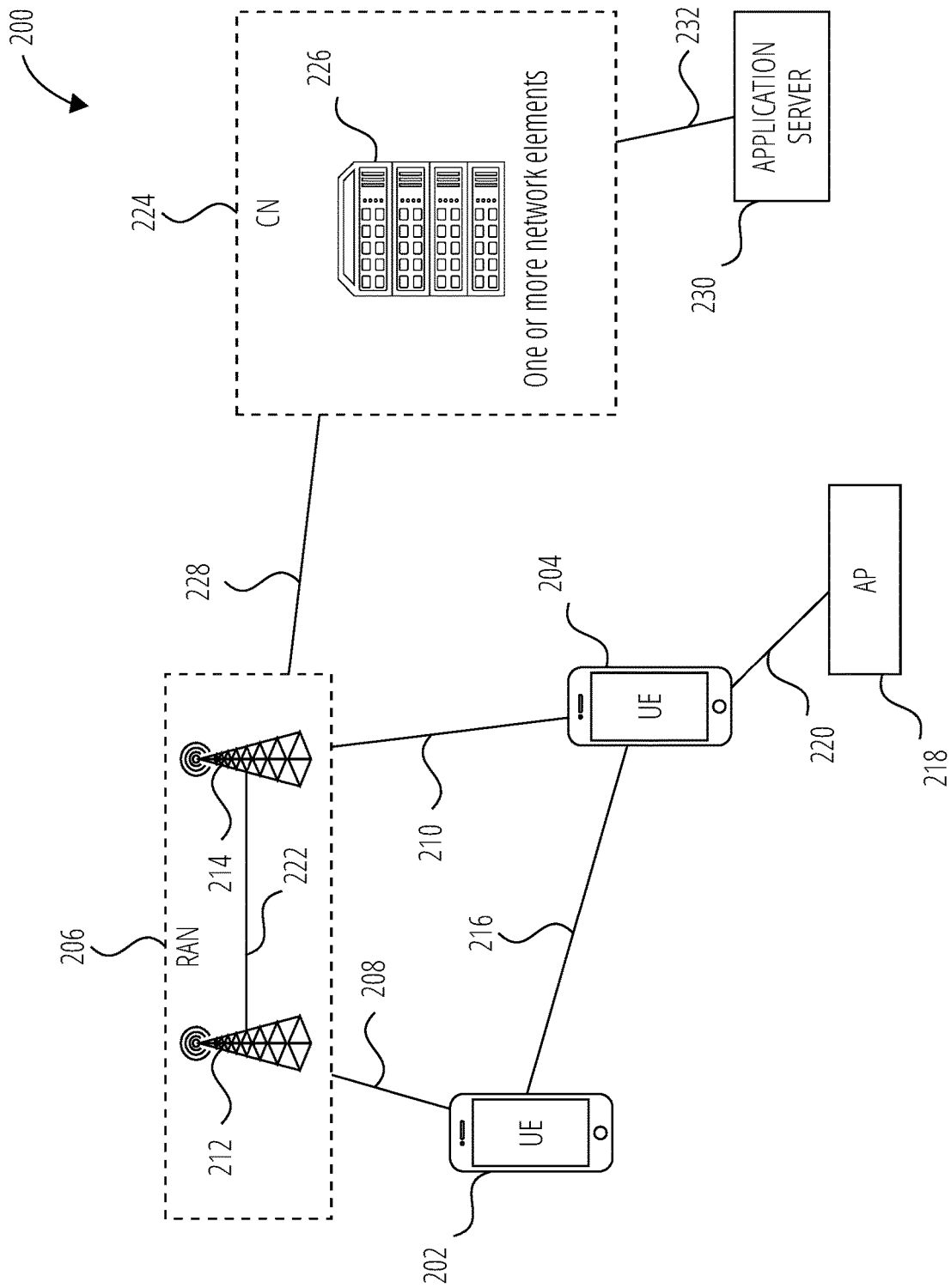
FIG. 2 illustrates an example architecture of a wireless communication system, according to embodiments disclosed herein.

FIG. 2 illustrates an example architecture of a wireless communication system 200, according to embodiments disclosed herein. The following description is provided for an example wireless communication system 200 that operates in conjunction with the LTE system standards and/or 5G or NR system standards as provided by 3GPP technical specifications.

As shown by FIG. 2, the wireless communication system 200 includes UE 202 and UE 204 (although any number of UEs may be used). In this example, the UE 202 and the UE 204 are illustrated as smartphones (e.g., handheld touchscreen mobile computing devices connectable to one or more cellular networks), but may also comprise any mobile or non-mobile computing device configured for wireless communication.

The UE 202 and UE 204 may be configured to communicatively couple with a RAN 206. In embodiments, the RAN 206 may be NG-RAN, E-UTRAN, etc. The UE 202 and UE 204 utilize connections (or channels) (shown as connection 208 and connection 210, respectively) with the RAN 206, each of which comprises a physical communications interface. The RAN 206 can include one or more base stations (such as base station 212 and base station 214) that enable the connection 208 and connection 210.

In this example, the connection 208 and connection 210 are air interfaces to enable such communicative coupling, and may be consistent with RAT(s) used by the RAN 206, such as, for example, an LTE and/or NR.

In some embodiments, the UE 202 and UE 204 may also directly exchange communication data via a sidelink interface 216. The UE 204 is shown to be configured to access an access point (shown as AP 218) via connection 220. By way of example, the connection 220 can comprise a local wireless connection, such as a connection consistent with any IEEE 802.11 protocol, wherein the AP 218 may comprise a Wi-Fi® router. In this example, the AP 218 may be connected to another network (for example, the Internet) without going through a CN 224.

In embodiments, the UE 202 and UE 204 can be configured to communicate using orthogonal frequency division multiplexing (OFDM) communication signals with each other or with the base station 212 and/or the base station 214 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 212 or base station 214 may be implemented as one or more software entities running on server computers as part of a virtual network. In addition, or in other embodiments, the base station 212 or base station 214 may be configured to communicate with one another via interface 222. In embodiments where the wireless communication system 200 is an LTE system (e.g., when the CN 224 is an EPC), the interface 222 may be an X2 interface. The X2 interface may be defined between two or more base stations (e.g., two or more eNBs and the like) that connect to an EPC, and/or between two eNBs connecting to the EPC. In embodiments where the wireless communication system 200 is an NR system (e.g., when CN 224 is a 5GC), the interface 222 may be an Xn interface. The Xn interface is defined between two or more base stations (e.g., two or more gNBs and the like) that connect to 5GC, between a base station 212 (e.g., a gNB) connecting to 5GC and an eNB, and/or between two eNBs connecting to 5GC (e.g., CN 224).

The RAN 206 is shown to be communicatively coupled to the CN 224. The CN 224 may comprise one or more network elements 226, which are configured to offer various data and telecommunications services to customers/subscribers (e.g., users of UE 202 and UE 204) who are connected to the CN 224 via the RAN 206. The components of the CN 224 may be implemented in one physical device or separate physical devices including components to read and execute instructions from a machine-readable or computer-readable medium (e.g., a non-transitory machine-readable storage medium).

In embodiments, the CN 224 may be an EPC, and the RAN 206 may be connected with the CN 224 via an S1 interface 228. In embodiments, the S1 interface 228 may be split into two parts, an S1 user plane (S1-U) interface, which carries traffic data between the base station 212 or base station 214 and a serving gateway (S-GW), and the S1-MME interface, which is a signaling interface between the base station 212 or base station 214 and mobility management entities (MMEs).

In embodiments, the CN 224 may be a 5GC, and the RAN 206 may be connected with the CN 224 via an NG interface 228. In embodiments, the NG interface 228 may be split into two parts, an NG user plane (NG-U) interface, which carries traffic data between the base station 212 or base station 214 and a user plane function (UPF), and the S1 control plane (NG-C) interface, which is a signaling interface between the base station 212 or base station 214 and access and mobility management functions (AMFs).

Generally, an application server 230 may be an element offering applications that use internet protocol (IP) bearer resources with the CN 224 (e.g., packet switched data services). The application server 230 can also be configured to support one or more communication services (e.g., VoIP sessions, group communication sessions, etc.) for the UE 202 and UE 204 via the CN 224. The application server 230 may communicate with the CN 224 through an IP communications interface 232.

Figure 3:
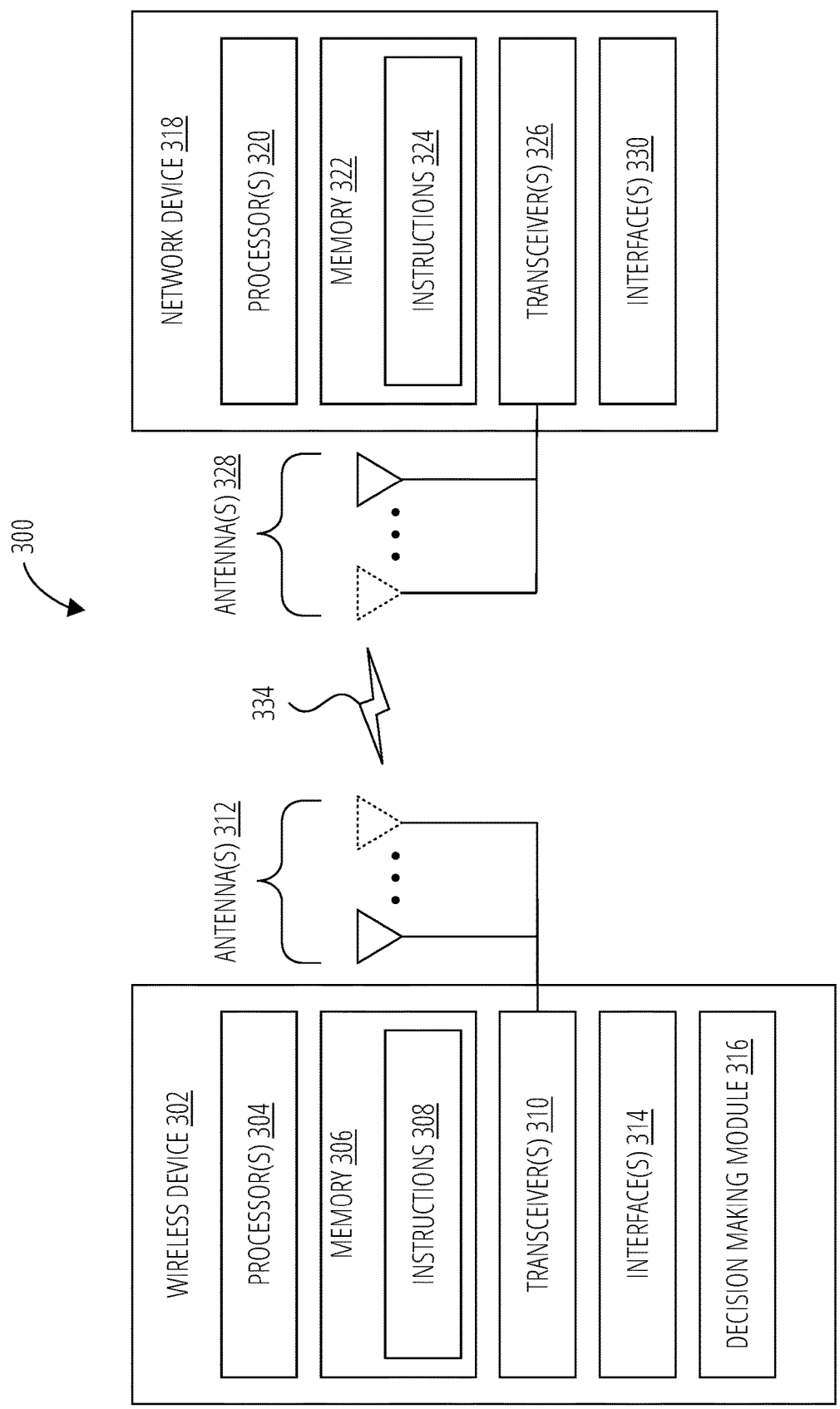
FIG. 3 illustrates a system for performing signaling between a wireless device and a network device, according to embodiments disclosed herein.

FIG. 3 illustrates a system 300 for performing signaling 334 between a wireless device 302 and a network device 318, according to embodiments disclosed herein. The system 300 may be a portion of a wireless communications system as herein described. The wireless device 302 may be, for example, a UE of a wireless communication system. The network device 318 may be, for example, a base station (e.g., an eNB or a gNB) of a wireless communication system.

The wireless device 302 may include one or more processor(s) 304. The processor(s) 304 may execute instructions such that various operations of the wireless device 302 are performed, as described herein. The processor(s) 304 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 302 may include a memory 306. The memory 306 may be a non-transitory computer-readable storage medium that stores instructions 308 (which may include, for example, the instructions being executed by the processor(s) 304). The instructions 308 may also be referred to as program code or a computer program. The memory 306 may also store data used by, and results computed by, the processor(s) 304.

The wireless device 302 may include one or more transceiver(s) 310 that may include radio frequency (RF) transmitter circuitry and/or receiver circuitry that use the antenna(s) 312 of the wireless device 302 to facilitate signaling (e.g., the signaling 334) to and/or from the wireless device 302 with other devices (e.g., the network device 318) according to corresponding RATs.

The wireless device 302 may include one or more antenna(s) 312 (e.g., one, two, four, or more). For embodiments with multiple antenna(s) 312, the wireless device 302 may leverage the spatial diversity of such multiple antenna(s) 312 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 302 may be accomplished according to precoding (or digital beamforming) that is applied at the wireless device 302 that multiplexes the data streams across the antenna(s) 312 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 302 may implement analog beamforming techniques, whereby phases of the signals sent by the antenna(s) 312 are relatively adjusted such that the (joint) transmission of the antenna(s) 312 can be directed (this is sometimes referred to as beam steering).

The wireless device 302 may include one or more interface(s) 314. The interface(s) 314 may be used to provide input to or output from the wireless device 302. For example, a wireless device 302 that is a UE may include interface(s) 314 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 310/antenna(s) 312 already described) that allow for communication between the UE and other devices and may operate according to known protocols (e.g., Wi-Fi®, Bluetooth®, and the like).

The wireless device 302 may include a decision making module 316. The decision making module 316 may be implemented via hardware, software, or combinations thereof. For example, the decision making module 316 may be implemented as a processor, circuit, and/or instructions 308 stored in the memory 306 and executed by the processor(s) 304. In some examples, the decision making module 316 may be integrated within the processor(s) 304 and/or the transceiver(s) 310. For example, the decision making module 316 may be implemented by a combination of software components (e.g., executed by a DSP or a general processor) and hardware components (e.g., logic gates and circuitry) within the processor(s) 304 or the transceiver(s) 310.

The decision making module 316 may be used for various aspects of the present disclosure, for example, aspects of FIG. 1A and FIG. 1B.

The network device 318 may include one or more processor(s) 320. The processor(s) 320 may execute instructions such that various operations of the network device 318 are performed, as described herein. The processor(s) 320 may include one or more baseband processors implemented using, for example, a CPU, a DSP, an ASIC, a controller, an FPGA device, another hardware device, a firmware device, or any combination thereof configured to perform the operations described herein.

The network device 318 may include a memory 322. The memory 322 may be a non-transitory computer-readable storage medium that stores instructions 324 (which may include, for example, the instructions being executed by the processor(s) 320). The instructions 324 may also be referred to as program code or a computer program. The memory 322 may also store data used by, and results computed by, the processor(s) 320.

The network device 318 may include one or more transceiver(s) 326 that may include RF transmitter circuitry and/or receiver circuitry that use the antenna(s) 328 of the network device 318 to facilitate signaling (e.g., the signaling 334) to and/or from the network device 318 with other devices (e.g., the wireless device 302) according to corresponding RATs.

The network device 318 may include one or more antenna(s) 328 (e.g., one, two, four, or more). In embodiments having multiple antenna(s) 328, the network device 318 may perform MIMO, digital beamforming, analog beamforming, beam steering, etc., as has been described.

The network device 318 may include one or more interface(s) 330. The interface(s) 330 may be used to provide input to or output from the network device 318. For example, a network device 318 that is a base station may include interface(s) 330 made up of transmitters, receivers, and other circuitry (e.g., other than the transceiver(s) 326/antenna(s) 328 already described) that enables the base station to communicate with other equipment in a core network, and/or that enables the base station to communicate with external networks, computers, databases, and the like for purposes of operations, administration, and maintenance of the base station or other equipment operably connected thereto.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to communicate with a new radio (NR) wireless network in a standalone (SA) deployment, the method comprising:
    camping the UE on a first cell of the NR wireless network in the SA deployment, wherein the first cell is a serving cell;
    determining, at the UE, that a first bandwidth (BW) of the first cell is greater than or equal to a threshold BW value;
    in response to the first BW of the first cell being greater than or equal to the threshold BW value and the UE not being configured by the NR wireless network for bandwidth part switching (BWPS), and based on one or more applications running on the UE, determining, at the UE, whether a second cell is available that is intraband with and has a same priority as the first cell and that has a second BW that is less than the threshold BW value, wherein the second cell is of the NR wireless network in the SA deployment;
    when the second cell is not available, searching for a third cell with a next lower priority than the first cell, that has a third BW that is less than the threshold BW value, and that has a received power measured at the UE greater than or equal to a reference signal received power (RSRP) threshold value, wherein the third cell is of the NR wireless network in the SA deployment; and
    when the second cell is available, camping the UE on the second cell.

2. The method of claim 1, further comprising:
    when the UE is camped on the second cell or the third cell, checking user experience metrics corresponding to one or more of a jitter buffer, a round-trip time (RTT) latency, and a packet loss percentage;
    in response to the user experience metrics meeting a predetermined criteria, and based on a current downlink (DL) data throughput, determining whether NR DL carrier aggregation (CA) combinations are available;
    when the NR DL CA combinations are available, keeping the UE camped on the second cell or the third cell; and
    when the NR DL CA combinations are not available, performing, at the UE, a radio resource control (RRC) release and camping the UE on an available SA cell with a corresponding BW that is greater than or equal to the threshold BW value.

3. The method of claim 1, further comprising:
    when the UE is camped on the second cell or the third cell, checking user experience metrics corresponding to one or more of a jitter buffer, a round-trip time (RTT) latency, and a packet loss percentage;
    in response to the user experience metrics meeting a predetermined criteria, and based on a current uplink (UL) data throughput, determining whether NR UL carrier aggregation (CA) combinations are available;
    when the NR UL CA combinations are available, keeping the UE camped on the second cell or the third cell; and
    when the NR UL CA combinations are not available, performing, at the UE, a radio resource control (RRC) release and camping the UE on an available SA cell with a corresponding BW that is greater than or equal to the threshold BW value.

4. The method of claim 1, further comprising:
when the UE is camped on the second cell or the third cell, checking user experience metrics corresponding to one or more of a jitter buffer, a round-trip time (RTT) latency, and a packet loss percentage; and
in response to the user experience metrics not meeting a predetermined criteria, performing, at the UE, a radio resource control (RRC) release and camping the UE on an available SA cell with a corresponding BW that is greater than or equal to the threshold BW value.

5. The method of claim 1, further comprising, when the second cell and the third cell are not available:
determining, at the UE, that the UE is experiencing power constraints based on at least one of the UE being in a low power mode (LPM), the UE having a battery percentage below a battery level threshold, and the UE having a thermal constraint;
in response to determining that the UE is experiencing the power constraints:
determining that the UE is attempting a voice over new radio (VoNR) call; and
determining that a long term evolution (LTE) cell is available;
when the UE is conducting the VoNR call and the LTE cell is available;
performing, at the UE, a first local resource radio control (RRC) release;
camping the UE on the LTE cell for a voice over LTE (VOLTE) call; and
in response to the VOLTE call ending, performing a second RRC release from the LTE cell and camping the UE on an available SA cell with a corresponding BW that is greater than or equal to the threshold BW value.

6. The method of claim 1, further comprising, when the second cell and the third cell are not available:
determining, at the UE, that the UE is not experiencing power constraints based on at least one of the UE being in a low power mode (LPM), the UE having a battery percentage below a battery level threshold, and the UE having a thermal constraint; and
in response to the UE not experiencing the power constraints, scheduling background data activity.

7. The method of claim 1, wherein determining, at the UE, whether the second cell is available that is intraband with and has the same priority as the first cell and that has the second BW that is less than the threshold BW value is based upon information received from at least one of a fingerprint database (FDB) based on location, a system information block (SIB), and previously known SA carrier aggregation (CA) combinations.

8. An apparatus for a user equipment (UE) to communicate with a new radio (NR) wireless network in a standalone (SA) deployment comprising:
a memory to store a threshold bandwidth (BW) value; and
one or more processors configured to:
camp the UE on a first cell of the NR wireless network in the SA deployment, wherein the first cell is a serving cell;
determine, at the UE, that a first bandwidth BW of the first cell is greater than or equal to the threshold BW value;
in response to the first BW of the first cell being greater than or equal to the threshold BW value and the UE not being configured by the NR wireless network for bandwidth part switching (BWPS), and based on one or more applications running on the UE, determine, at the UE, whether a second cell is available that is intraband with and has a same priority as the first cell and that has a second BW that is less than the threshold BW value, wherein the second cell is of the NR wireless network in the SA deployment;
when the second cell is not available, search for a third cell with a next lower priority than the first cell, that has a third BW that is less than the threshold BW value, and that has a received power measured at the UE greater than or equal to a reference signal received power (RSRP) threshold value, wherein the third cell is of the NR wireless network in the SA deployment; and
when the second cell is available, camp the UE on the second cell.

9. The apparatus of claim 8, the one or more processors further configured to:
when the UE is camped on the second cell or the third cell, check user experience metrics corresponding to one or more of a jitter buffer, a round-trip time (RTT) latency, and a packet loss percentage;
in response to the user experience metrics meeting a predetermined criteria, and based on a current downlink (DL) data throughput, determine whether NR DL carrier aggregation (CA) combinations are available;
when the NR DL CA combinations are available, keep the UE camped on the second cell or the third cell; and
when the NR DL CA combinations are not available, perform, at the UE, a radio resource control (RRC) release and camp the UE on an available SA cell with a corresponding BW that is greater than or equal to the threshold BW value.

10. The apparatus of claim 8, the one or more processors further configured to:
when the UE is camped on the second cell or the third cell, check user experience metrics corresponding to one or more of a jitter buffer, a round-trip time (RTT) latency, and a packet loss percentage;
in response to the user experience metrics meeting a predetermined criteria, and based on a current uplink (UL) data throughput, determine whether NR UL carrier aggregation (CA) combinations are available;
when the NR UL CA combinations are available, keep the UE camped on the second cell or the third cell; and
when the NR UL CA combinations are not available, perform, at the UE, a radio resource control (RRC) release and camp the UE on an available SA cell with a corresponding BW that is greater than or equal to the threshold BW value.

11. The apparatus of claim 8, the one or more processors further configured to:
when the UE is camped on the second cell or the third cell, check user experience metrics corresponding to one or more of a jitter buffer, a round-trip time (RTT) latency, and a packet loss percentage; and
in response to the user experience metrics not meeting a predetermined criteria, perform, at the UE, a radio resource control (RRC) release and camp the UE on an available SA cell with a corresponding BW that is greater than or equal to the threshold BW value.

12. The apparatus of claim 8, the one or more processors further configured to, when the second cell and the third cell are not available:
determine, at the UE, that the UE is experiencing power constraints based on at least one of the UE being in a low power mode (LPM), the UE having a battery percentage below a battery level threshold, and the UE having a thermal constraint;
in response to determining that the UE is experiencing the power constraints;
  determine that the UE is attempting a voice over new radio (VoNR) call; and
  determine that a long term evolution (LTE) cell is available;
when the UE is conducting the VoNR call and the LTE cell is available;
  perform, at the UE, a first local resource radio control (RRC) release;
  camp the UE on the LTE cell for a voice over LTE (VOLTE) call; and
  in response to the VOLTE call ending, perform a second RRC release from the LTE cell and camp the UE on an available SA cell with a corresponding BW that is greater than or equal to the threshold BW value.

13. The apparatus of claim 8, the one or more processors further configured to, when the second cell and the third cell are not available:
  determine, at the UE, that the UE is not experiencing power constraints based on at least one of the UE being in a low power mode (LPM), the UE having a battery percentage below a battery level threshold, and the UE having a thermal constraint; and
  in response to the UE not experiencing the power constraints, schedule background data activity.

14. The apparatus of claim 8, wherein to determine, at the UE, whether the second cell is available that is intraband with and has the same priority as the first cell and that has the second BW that is less than the threshold BW value is based upon information received from at least one of a fingerprint database (FDB) based on location, a system information block (SIB), and previously known SA carrier aggregation (CA) combinations.

15. A non-transitory computer-readable storage medium of a user equipment (UE) to communicate with a new radio (NR) wireless network in a standalone (SA) deployment, the non-transitory computer-readable storage medium having computer-readable instructions stored thereon, the computer-readable instructions configured to instruct one or more processors to:
  camp the UE on a first cell of the NR wireless network in the SA deployment, wherein the first cell is a serving cell;
  determine, at the UE, that a first bandwidth (BW) of the first cell is greater than or equal to a threshold BW value;
  in response to the first BW of the first cell being greater than or equal to the threshold BW value and the UE not being configured by the NR wireless network for bandwidth part switching (BWPS), and based on one or more applications running on the UE, determine, at the UE, whether a second cell is available that is intraband with and has a same priority as the first cell and that has a second BW that is less than the threshold BW value, wherein the second cell is of the NR wireless network in the SA deployment;
  when the second cell is not available, search for a third cell with a next lower priority than the first cell, that has a third BW that is less than the threshold BW value, and that has a received power measured at the UE greater than or equal to a reference signal received power (RSRP) threshold value, wherein the third cell is of the NR wireless network in the SA deployment; and
  when the second cell is available, camp the UE on the second cell.

16. The non-transitory computer-readable storage medium of claim 15, wherein the computer-readable instructions are further configured to:
  when the UE is camped on the second cell or the third cell, check user experience metrics corresponding to one or more of a jitter buffer, a round-trip time (RTT) latency, and a packet loss percentage;
  in response to the user experience metrics meeting a predetermined criteria, and based on a current downlink (DL) data throughput, determine whether NR DL carrier aggregation (CA) combinations are available;
  when the NR DL CA combinations are available, keep the UE camped on the second cell or the third cell; and
  when the NR DL CA combinations are not available, perform, at the UE, a radio resource control (RRC) release and camp the UE on an available SA cell with a corresponding BW that is greater than or equal to the threshold BW value.

17. The non-transitory computer-readable storage medium of claim 15, wherein the computer-readable instructions are further configured to:
  when the UE is camped on the second cell or the third cell, check user experience metrics corresponding to one or more of a jitter buffer, a round-trip time (RTT) latency, and a packet loss percentage;
  in response to the user experience metrics meeting a predetermined criteria, and based on a current uplink (UL) data throughput, determine whether NR UL carrier aggregation (CA) combinations are available;
  when the NR UL CA combinations are available, keep the UE camped on the second cell or the third cell; and
  when the NR UL CA combinations are not available, perform, at the UE, a radio resource control (RRC) release and camp the UE on an available SA cell with a corresponding BW that is greater than or equal to the threshold BW value.

18. The non-transitory computer-readable storage medium of claim 15, wherein the computer-readable instructions are further configured to:
  when the UE is camped on the second cell or the third cell, check user experience metrics corresponding to one or more of a jitter buffer, a round-trip time (RTT) latency, and a packet loss percentage; and
  in response to the user experience metrics not meeting a predetermined criteria, perform, at the UE, a radio resource control (RRC) release and camp the UE on an available SA cell with a corresponding BW that is greater than or equal to the threshold BW value.

19. The non-transitory computer-readable storage medium of claim 15, wherein the computer-readable instructions are further configured to, when the second cell and the third cell are not available:
  determine, at the UE, that the UE is experiencing power constraints based on at least one of the UE being in a low power mode (LPM), the UE having a battery percentage below a battery level threshold, and the UE having a thermal constraint;
  in response to determining that the UE is experiencing the power constraints:
    determine that the UE is attempting a voice over new radio (VoNR) call; and
    determine that a long term evolution (LTE) cell is available;

when the UE is conducting the VoNR call and the LTE cell is available:
   perform, at the UE, a first local resource radio control (RRC) release;
   camp the UE on the LTE cell for a voice over LTE (VOLTE) call; and
in response to the VOLTE call ending, perform a second RRC release from the LTE cell and camp the UE on an available SA cell with a corresponding BW that is greater than or equal to the threshold BW value.

20. The non-transitory computer-readable storage medium of claim 15, wherein the computer-readable instructions are further configured to, when the second cell and the third cell are not available:
   determine, at the UE, that the UE is not experiencing power constraints based on at least one of the UE being in a low power mode (LPM), the UE having a battery percentage below a battery level threshold, and the UE having a thermal constraint; and
   in response to the UE not experiencing the power constraints, schedule background data activity.

* * * * *